(12) United States Patent
Jue

(10) Patent No.: US 6,567,931 B1
(45) Date of Patent: May 20, 2003

(54) PREVENTING FALSE REMOTE SYSTEM WAKE EVENTS FOLLOWING AC POWER LOSS

(75) Inventor: Stephen D. Jue, Austin, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

(21) Appl. No.: 09/484,329

(22) Filed: Jan. 18, 2000

(51) Int. Cl.[7] .............................. G06F 11/00; G06F 1/30
(52) U.S. Cl. ............................ 714/23; 714/24; 714/22; 713/310; 713/340
(58) Field of Search .......................... 714/22, 23, 24, 714/14; 713/300, 310, 340

(56) References Cited

U.S. PATENT DOCUMENTS

| | | | |
|---|---|---|---|
| 5,276,890 A | * 1/1994 | Arai .............................. 713/1 |
| 5,675,364 A | 10/1997 | Stedman et al. ............ 345/211 |
| 5,715,465 A | 2/1998 | Savage et al. ............... 395/750 |
| 5,832,283 A | * 11/1998 | Chou et al. ..................... 713/1 |
| 5,991,806 A | * 11/1999 | McHann, Jr. ................ 709/224 |
| 6,052,793 A | * 4/2000 | Mermelstein ................ 713/340 |
| 6,393,570 B1 | * 5/2002 | Henderson et al. .......... 713/310 |
| 6,408,397 B1 | * 6/2002 | Alexander et al. .......... 713/340 |

* cited by examiner

Primary Examiner—Robert Beausoliel
Assistant Examiner—Yolanda L. Wilson
(74) Attorney, Agent, or Firm—Baker Botts L.L.P.

(57) ABSTRACT

A basic input output system (BIOS) or equivalently functional circuitry can determine when an invalid shutdown event occurred (e.g., power loss) and subsequently, whether a false remote system wake event is received by the computer system and allow processing to bypass wakeup processing to avoid false wakeup commands received from components of the computer system such as LAN cards and modems. A computer system employing false wakeup command functionality is further claimed along with medium storing means for preventing wakeup processing when a false wakeup command is received.

20 Claims, 3 Drawing Sheets

PREVENTING FALSE REMOTE SYSTEM WAKE EVENTS FOLLOWING AC POWER LOSS

BACKGROUND OF THE INVENTION

1. Field of the Invention

This invention relates to power management for computer systems and, more particularly, to prevention of false remote system wake events after a computer system suffers a power loss.

2. Description of the Related Art

Many computer systems, including personal computers, workstations, servers, and embedded systems are designed to have multiple peripheral devices included in the system. A typical personal computer system includes a processor, associated memory and control logic, and a number of peripheral devices that provide input and output (I/O) for the system. Such peripheral devices include, for example, compact disc read-only memory (CD-ROM) drives, hard disk drives, floppy disk drives, and other mass storage devices such as tape drives, compact disc recordable (CD-R) drives, or digital video/versatile disk (DVD) drives. Additionally, the underlying circuitry of computer systems including processors, graphics chips, memories, and control logic are continually becoming more complex and feature-rich.

One of the features of newer computers is directed towards reducing the computer's power consumption. To reduce power consumption, various components of a computer system can be placed into a variety of different power states with differing levels of power consumption. For example, video output from a computer system, processor operation, and hard disk drive rotation can be deactivated during periods of system inactivity. More sophisticated power management schemes have been developed and implemented as industry standards including the Advanced Power Management (APM) Specification described in the *Advanced Power Management (APM) BIOS Interface Specification, Revision* 1.2, dated February, 1996, and the Advanced Configuration and Power Interface (ACPI) standard described in the *Advanced Configuration and Power Interface Specification, Revision* 1.0, dated Dec. 22, 1996, both of which are hereby incorporated herein, in there entirety, by reference.

Such standards define a variety of operational states depending upon system activity and the amount of power being consumed. For example, the ACPI specification defines six "sleeping" states S0–S5. In the S0 state (also known as the G0 state) the computer system is fully on and operational, consuming maximum power. In the S5 state (also known as the soft-off state) the computer system consumes a minimal amount of power. No code is executed in the computer system, almost all devices are inactive, and the computer system awaits a wakeup event to transition it to a higher activity state. Awakening from the soft-off state requires a complete boot of the computer system because no system context is saved prior to entering S5. The sleep states between S0 and S5 each specify varying amounts of component activity and therefore power consumption. States S1–S4 may have differing wakeup latency times depending upon which devices are inactive, how much computer system context was saved prior to entering the sleep state, and other factors. Power management schemes like APM and ACPI need not have multiple sleep states, but may simply have a fully on state and a state of lower power consumption, such as a soft-off power state.

Another feature in computer systems allows the system to be configured to wake from the soft-off sleep state in response to a variety of different wakeup events ("remote system wake events") which include waking up on local area network (LAN) where the computer system's LAN adapter or network interface card (NIC) monitors network traffic for a wakeup signal such as a Magic Packet™, wakeup on ring indicated (RI) where a modem asserts its RI line when it detects a ring on the phone line, and wakeup from any other external signal designed to wake a computer up from a low-power or soft-off state. Remote system wake events provide greater manageability of computer systems by allowing system administrators to manage large numbers of computers remotely without having to keep all computers powered up. When maintenance is needed for a computer system, the administrator can send a remote system wake event to the computer to wake up the computer, perform necessary maintenance on the computer remotely by adding, deleting, or modifying settings and files on the computer, and then remotely power-off the remote computer back to the original soft-off state.

System support for these wakeup events is usually implemented in a power management circuit that is part of the computer system's core logic chipset. One example of a core logic chip that includes power management circuitry is available from Intel Corporation under the trade designation 82371AB PCI-to-ISA/IDE Xcelerator (PIIX4). The PIIX4 supports wakeup from soft-off events by maintaining power to its suspend well logic and monitoring appropriate registers, while power to the rest of the chip (and most or all of the rest of the computer system) is removed. In one example of enabling a computer system using the PIIX4 to transition from the soft-off state to the full on power state after a remote system wake event generated from a LAN card, bit 9 of the PIIX4's General Purpose Enable Register (GPEN) is set to 1. With remote system wake events from a LAN card thus enabled, when the PIIX4 receives an appropriate signal from the attached network, bit 9 of the General Purpose Status Register (GPSTS) is asserted and the computer system begins the transition to the fully on power state.

As the example of the PIIX4 illustrates, when the system is in the soft-off state, it appears to a user that the system is off, even though some power management circuitry is still powered and monitoring inputs, such as the power button, to determine if the system should be turned on. Typically, a user first selects desired wakeup events via a system setup utility, which stores appropriate settings in a nonvolatile memory (usually a battery backed static random access memory (SRAM)) so that the computer system's basic input output system (BIOS) can restore the settings each time the computer system performs a complete boot and/or when the computer system performs a normal shutdown (e.g., a transition to the soft-off power state).

Waking a system up from a soft-off state generally works well when the power level to the computer system is stable and the system stays in the soft-off state. However, when an invalid shutdown event occurs (e.g., a power loss due to AC power failure), and subsequently corrected (e.g., power is re-applied) a false wake event sometimes occurs. The false wake event is sometimes the result of a race condition wherein components of the computer system receive power simultaneously and generate unpredictable signals from components, such as the LAN card and modem, to the computer system. These signals may appear to the computer system to be a wakeup command. Two side effects may result from the false wake event. First, the system password (if implemented) may be skipped. Many computer systems bypass the system password when a system administrator issues a remote wake command in order to wake up the computer system. This is done to prevent a computer system from booting to a password screen which would require someone local to the system supply a password which would defeat the purpose of remote system wake events. In a false wake condition, power re-applied to a computer system causes the system to behave as if a remote wake command has been issued, thereby bypassing the system password.

Second, some computer systems provide an AC power recovery feature that allows the user to define what power state the machine should enter following an AC power loss and subsequent recovery. The power recovery options are typically "ON", "OFF", and "LAST." Some organizations are sensitive to large quantities of computer systems switching to the "ON" state during a subsequent recovery because of the large AC power surge that would occur. For this reason, these organizations may choose the "OFF" option. However, a false wake condition caused by AC recovery would cause the systems to behave as if they received a wakeup command, causing large numbers of computers to turn on after AC recovery thereby creating a potential AC power surge.

SUMMARY OF THE INVENTION

It has been discovered that determining when an invalid event occurs and responsively bypassing a system's remote system wake event functions allows a computer system to be returned to the soft-off power state. Because power has just been restored to the computer system, it is improbable that a remote system wake event and power restoration condition occur simultaneously.

Accordingly, one aspect of the present invention provides a method of determining whether an invalid event (e.g., AC power loss) occurred in the computer system. When the power restoration was caused by an invalid event, wakeup event information is read from a nonvolatile memory and the computer system bypasses remote wakeup processing.

Another aspect of the invention provides a basic input output system (BIOS). The BIOS includes a wakeup routine, a reset determination routine, and a reset handling routine. The wakeup routine responds to remote system wake events to wake the computer system up from a soft-off state. The reset determination routine determines whether an invalid event occurred in the computer system. The reset handling routine bypasses the wakeup routine if it is determined that an invalid event occurred in the computer system.

In still another aspect of the invention, a computer system includes a processor, a volatile memory coupled to the processor, a nonvolatile memory coupled to the processor, a power management circuit coupled to the processor, and a basic input output system (BIOS). The power management circuit includes at least one wakeup event register. The BIOS is encoded in a computer readable medium as instructions executable on the processor, and includes a remote system wake event routine, a reset determination routine, and a reset handling routine. The remote system wake event responds to remote system wake commands to wake the computer system up from a soft-off state. The reset determination routine determines whether an invalid event occurred in the computer system. The reset handling routine bypasses the wakeup routine if it is determined that an invalid event occurred in the computer system.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
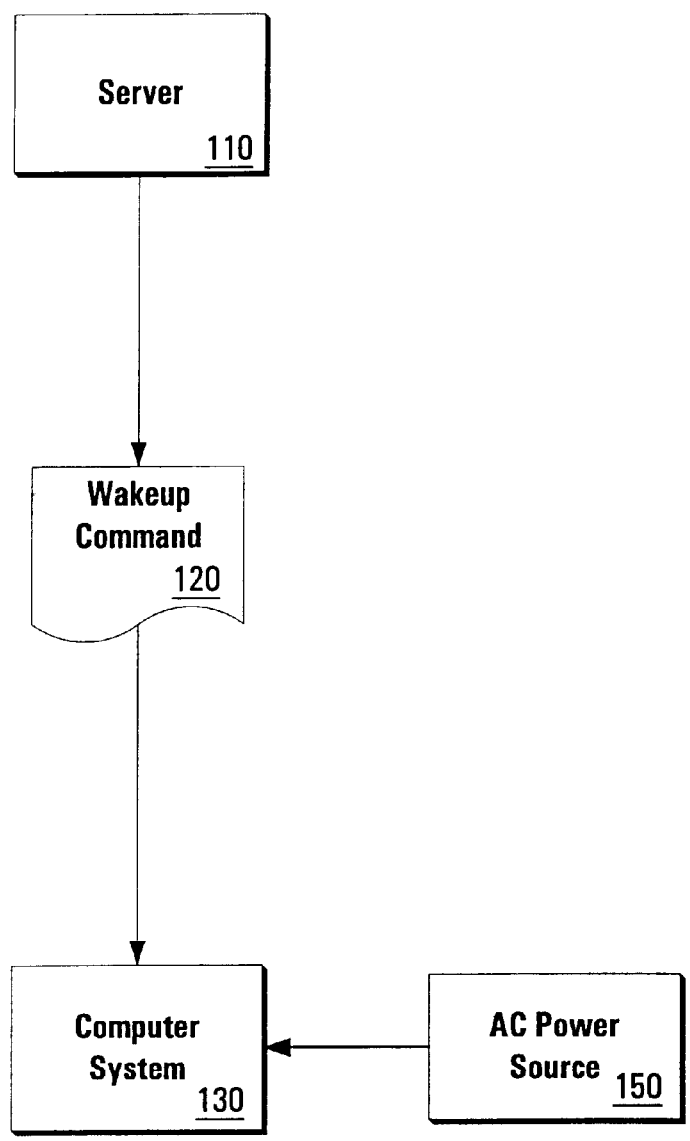
FIG. 1 is a system diagram of a computer system connected to a server and power supply.

FIG. 1 shows a system diagram of server 110 issuing wakeup command 120 to computer system 130. Wakeup command 120 may be any remote system wake event, such as a wakeup command issued across a local area network (LAN), a wake on ring command sent to computer system 130 using a modem connected to the public telephone exchange, or any external signal that is predetermined to cause computer system 130 to wake up from a sleep state (such as the S5 soft-off state) to a higher power level state. Wake command 120 may cause computer system 130 to boot, resulting in the execution of the basic input output system (BIOS) on computer system 130 as well as the invocation of an operating system (such as Microsoft® Windows 95/98/NT) along with possible application programs scheduled to be executed on computer system 130. Computer system 130 is connected to AC power source 150 in order for computer system to operate. Even when computer system 130 is turned "off" by the user, small amounts of current, sometimes called "flea power," are provided to computer system 130 to keep computer system 130 in a soft-off state and capable of being woken up by remote wakeup commands 120. When AC power source 150 is lost, computer system 130 receives no power and is no longer in any power state including the soft-off state. Upon AC power source 150 being restored to computer system 130, devices that receive wakeup commands 120, such as modems and LAN cards, may produce unpredictable signals that may cause computer system 130 to behave as if wakeup command 120 has been issued. In order to prevent false wakeup commands, computer system 130 recognizes that AC power source 150 was terminated during the prior powered session of computer system 130 and bypasses any wakeup commands that may be received after an invalid shutdown event (e.g., boot from a prior loss of power condition).

Figure 2:
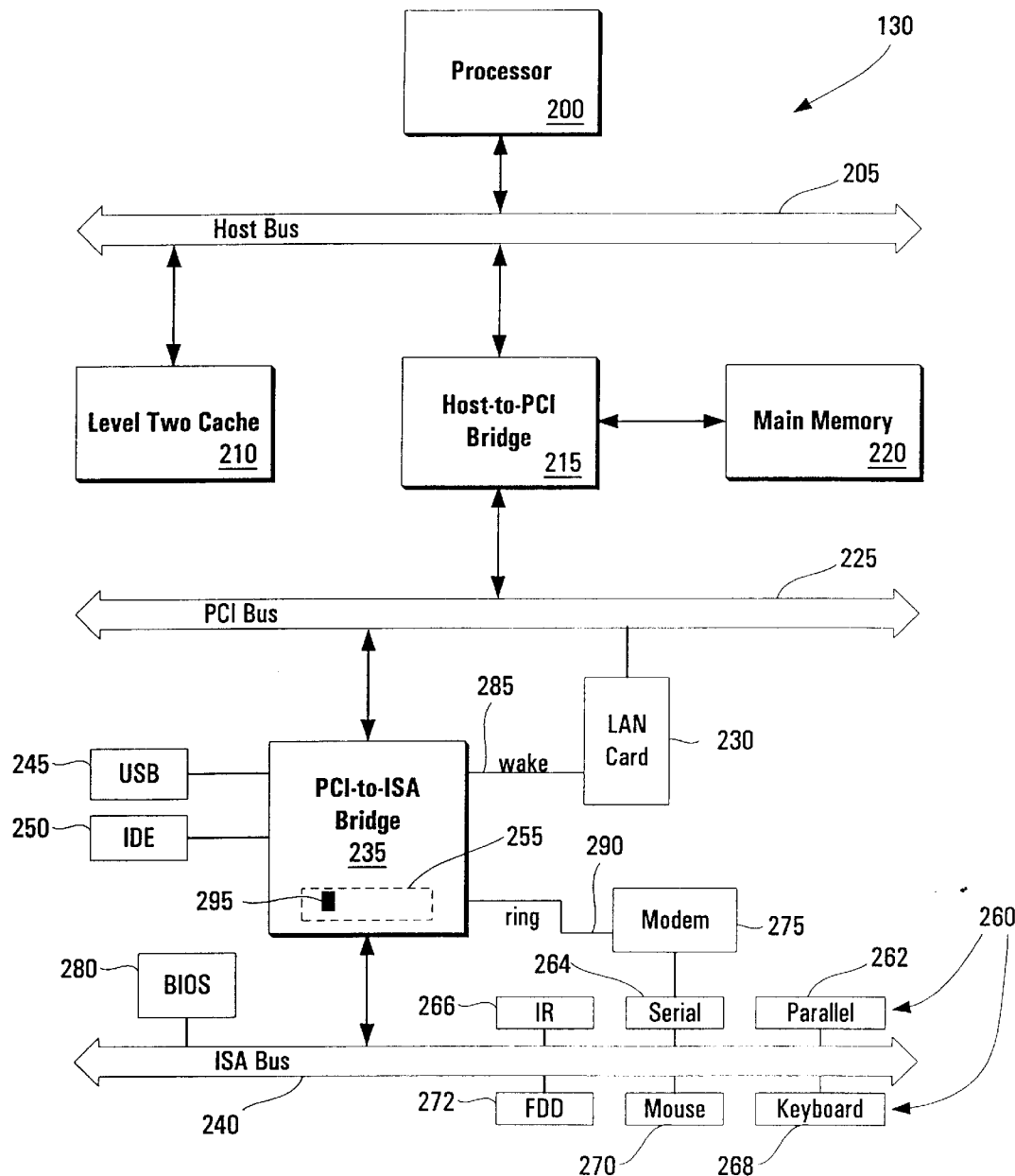
FIG. 2 is a block diagram of a computer system.

FIG. 2 illustrates a computer system 130 which is a simplified example of a computer system capable of bypassing a false wakeup command following an invalid shutdown event. Computer system 130 includes processor 200 which is coupled to host bus 205. A level two (L2) cache memory 210 is also coupled to the host bus 205. Host-to-PCI bridge 215 is coupled to main memory 220, includes cache memory and main memory control functions, and provides bus control to handle transfers among PCI bus 225, processor 200, L2 cache 210, main memory 220, and host bus 205. PCI bus 225 provides an interface for a variety of devices including, for example, LAN card 230. PCI-to-ISA bridge 235 provides bus control to handle transfers between PCI bus 225 and ISA bus 240, universal serial bus (USB) functionality 245, IDE device functionality 250, power management functionality 255, and can include other functional elements not shown, such as a real-time clock (RTC), DMA control, interrupt support, and system management bus support. An example of PCI-to-ISA bridge 235 is the aforementioned PIIX4. Peripheral devices and input/output (I/O) devices can be attached to various interfaces 260 (e.g., parallel interface 262, serial interface 264, infrared (IR) interface 266, keyboard interface 268, mouse interface 270, and fixed disk (FDD) 272) coupled to ISA bus 240. Alternatively, many I/O devices can be accommodated by a super I/O controller (not shown) attached to ISA bus 240. I/O devices such as modem 275 are coupled to the appropriate I/O interface, for example a serial interface as shown in FIG. 2.

The BIOS 280 is coupled to ISA bus 240, and incorporates the necessary processor executable code for a variety of low-level system functions and system boot functions, including the capability to restore remote system wake events after an invalid shutdown event. BIOS 280 can be stored in any computer readable medium, including magnetic storage media, optical storage media, flash memory, random access memory, read only memory, and communications media conveying signals encoding the instructions (e.g., signals from a network). In order to implement remote system wake event capability over a local area network, LAN card 230 is coupled to PCI-to-ISA bridge 235 and the power management functionality 255 through wake indicator 285. Similarly, to implement remote system wake event over a modem to wakeup when the a ring is detected, the ring indicate line 290 couples to PCI-to-ISA bridge 235 and the power management functionality 255.

Power management functionality 255 can include the logic and registers necessary to implement a power management standard such as ACPI, and sleep states and wakeup events such as those described above. Additionally, a nonvolatile memory, such as a battery backed SRAM (not shown) is used to store BIOS parameters, wakeup event information, and power state information. Such a nonvolatile memory can be a separate component, or integrated within another component such as PCI-to-ISA bridge 235.

It has been determined that upon booting computer system 130 from a previous state wherein a power loss condition occurred, LAN card 230 may provide a false wake indicator 285 which will wake computer system 130 when power is resumed to the computer system. In order to prevent such false remote system wake events, BIOS 280 can bypass the remote system wake event processing if a prior power loss condition is detected. Power management functionality 255 can include power loss register 295 that is stored in nonvolatile memory. When power is removed from computer system 130, power management functionality 255 sets power loss register 295. When the computer is rebooted, BIOS 280 checks power loss register 295 to determine whether the previous use of computer system 130 was halted due to a power loss situation. If a previous power loss situation is detected, BIOS 280 bypasses processing wake indicator 285 that may appear to be generated from LAN card 230.

In addition to false remote system wake event received from LAN card 230, false remote system wake events may result from wake on ring commands that occur when computer system 130 is booted following a prior power loss condition. Similarly to false wake indicator 285 provided by LAN card 230 described above, BIOS 280 checks power loss register 295 to determine whether a power loss condition occurred. If a power loss condition is detected, BIOS 280 bypasses processing remote system wake event that may appear to be generated from modem 275.

Figure 3:
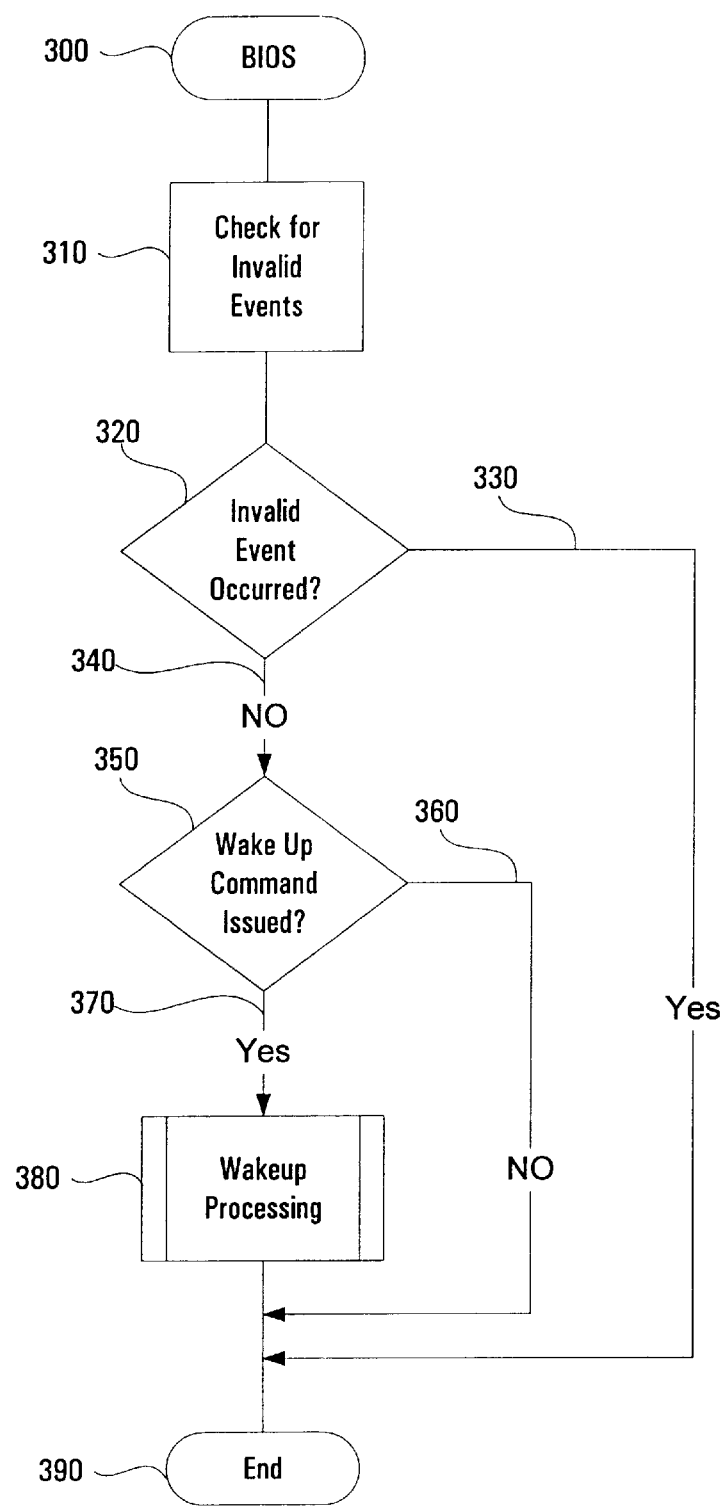
FIG. 3 is a flowchart illustrating a method for bypassing a remote system wake event following an invalid event.

FIG. 3 illustrates the operation of the BIOS to bypass wakeup processing when an invalid event causing a false wakeup command occurs. The process begins when the BIOS is invoked by the computer system and BIOS processing begins at 300. At check for invalid events 310, invalid events possibly causing a false wakeup command are checked. Check invalid events 310 would check registers, such as power loss register 295 (shown in FIG. 2) and other known events that may trigger false wakeup commands. Decision 320 determines whether an invalid event condition has occurred. If an invalid event condition has occurred, "yes" branch 330 is taken bypassing wakeup processing. If decision 320 determines that an invalid event condition has not occurred, "no" branch 340 is taken in order to process possible wakeup commands. At decision 350, the BIOS determines whether a remote system wake event has occurred. If decision 350 determines that a remote system wake event has not been received, "no" branch 360 is taken bypassing further wakeup command processing. On the other hand, if decision 350 determines that a remote system wake event has been received, "yes" branch 370 is taken wherein standard wakeup command processing 380 takes place in order to wakeup the computer system and change the computer's power state and run any predefined processes, such as operating systems and application programs, so that the computer system is operational. At termination 390, BIOS processing is completed.

Those having ordinary skill in the art will readily recognize suitable software implementations for the invalid event conditions and detection of corresponding false wakeup events described above. The particular structures depicted in FIGS. 1, 2 and 3 are merely illustrative of an exemplary set of suitable implementations. In addition to the various possible software implementations for the reset validity, wakeup event restoration, and power state selection routines, the same routines can be equivalently implemented in logic circuitry.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method of preventing a false remote system wake event in a computer system, said method comprising:
   determining whether an invalid event occurred in a computer system; and
   detecting a remote system wake event, wherein:
      if the invalid event occurred, then ignore the remote system wake event, and
      if the invalid event did not occur, then process the remote system wake event.

2. The method of claim 1 wherein the invalid event is a loss of power to the computer system.

3. The method of claim 1 wherein the step of determining whether an invalid event occurred comprises the step of checking a location of nonvolatile memory in the computer system to determine whether the location indicates that the invalid event occurred.

4. The method of claim 1 wherein the nonvolatile memory is battery backed static random access memory (SRAM).

5. The method of claim 1 further comprising the step of storing invalid event data upon detection of the invalid event, wherein the step of storing occurs prior to the step of determining.

6. The method of claim 5 wherein the step of storing includes the step of setting a flag bit in a nonvolatile memory register when a loss of power condition occurs in the computer system.

7. A basic input-output system (BIOS) comprising:
   a wakeup routine, the wakeup routine programmed to change a power state of a computer system in response to a remote system wakeup event;

a reset determination routine for determining whether an invalid event occurred in the computer system; and a bypass handling routine that bypasses the wakeup routine when the reset determination routine determines that an invalid event occurred in the computer system.

8. The BIOS of claim 7 wherein the invalid event is a loss of power to the computer system.

9. The BIOS of claim 7 wherein the reset determination routine checks an area of nonvolatile memory in the computer system, the area including a flag that is set when the invalid event occurs.

10. The BIOS of claim 9 wherein the nonvolatile memory is battery backed static random access memory (SRAM).

11. The BIOS of claim 7 further comprising an invalid event detection routine that detects invalid events and stores data corresponding to such events.

12. The BIOS of claim 11 wherein the invalid detection routine stores event data in a nonvolatile memory when a loss of power condition occurs in the computer system.

13. A computer system comprising:

a processor;

a nonvolatile memory coupled to the processor;

a power management circuit coupled to the processor, the power management circuit including at least one wakeup event register; and a basic input output system (BIOS) encoded in a computer readable medium as instructions executable on the processor, the BIOS including:

a wakeup routine, the wakeup routine programmed to change a power state of a computer system in response to a remote system wakeup event; and a reset determination routine for determining whether an invalid event occurred in the computer system; and a bypass handling routine that bypasses the wakeup routine when the reset determination routine determines that an invalid event occurred in the computer system.

14. The computer system of claim 13 wherein the invalid event is a loss of power to the computer system.

15. The computer system of claim 13 wherein the reset determination routine reads the nonvolatile memory, the nonvolatile memory including a flag that is set when the invalid event occurs.

16. The computer system of claim 13 wherein the nonvolatile memory is battery backed static random access memory (SRAM).

17. The computer system of claim 13 further comprising an invalid event detection routine that detects invalid events and stores data corresponding to such events in the nonvolatile memory.

18. The computer system of claim 17 wherein the invalid detection routine stores event data when a loss of power condition occurs in the computer system.

19. A computer operable medium for responding to a remote system wake event detected by a computer system, said medium comprising:

means for determining whether an invalid event occurred in a computer system;

means for detecting a remote system wake event; and means for bypassing a remote system wake event handler if the invalid event has occurred.

20. The computer operable medium of claim 19 wherein the invalid event is a loss of power to the computer system.

* * * * *